(12) United States Patent
Wuerth et al.

(10) Patent No.: US 8,950,827 B2
(45) Date of Patent: Feb. 10, 2015

(54) BRAKE DEVICE FOR A MOTOR VEHICLE HAVING AT LEAST THREE BRAKE CIRCUITS

(75) Inventors: Gebhard Wuerth, Sulzbach-Laufen (DE); Volker Mehl, Weingarten (DE); Michael Kunz, Steinheim an der Murr (DE); Matthias Leiblein, Gerlingen (DE); Werner Quirant, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 779 days.

(21) Appl. No.: 12/736,820

(22) PCT Filed: Apr. 20, 2009

(86) PCT No.: PCT/EP2009/054663
§ 371 (c)(1),
(2), (4) Date: Jan. 26, 2011

(87) PCT Pub. No.: WO2009/149977
PCT Pub. Date: Dec. 17, 2009

(65) Prior Publication Data
US 2011/0108375 A1  May 12, 2011

(30) Foreign Application Priority Data
Jun. 11, 2008 (DE) .......................... 10 2008 002 345

(51) Int. Cl.
*B60T 7/00* (2006.01)
*B60T 8/1766* (2006.01)
*B60T 8/34* (2006.01)
*B60T 8/40* (2006.01)
*B60T 8/48* (2006.01)

(52) U.S. Cl.
CPC .............. *B60T 8/1766* (2013.01); *B60T 8/344* (2013.01); *B60T 8/4072* (2013.01); *B60T 8/4872* (2013.01); *B60T 2270/608* (2013.01)

USPC ............. 303/15; 303/3; 303/9.62; 303/113.5; 303/116.1

(58) Field of Classification Search
USPC ............ 303/15, 16, 3, 226.1, 9.62, 9.71, 140, 303/152, 113.5, 186, 116.1; 188/349; 180/65.1, 65.2
See application file for complete search history.

(56) References Cited

U.S. PATENT DOCUMENTS

| 5,472,264 | A  | * | 12/1995 | Klein et al. ........................ 303/3 |
| 6,394,561 | B1 | * | 5/2002  | Sakamoto et al. ....... 303/122.05 |
| 7,059,691 | B2 | * | 6/2006  | Tsunehara et al. ............ 303/152 |

(Continued)

FOREIGN PATENT DOCUMENTS

| CN | 1320532 | 11/2001 |
| CN | 1321027 | 6/2007 |

(Continued)

*Primary Examiner* — Thomas J Williams
*Assistant Examiner* — Mariano Sy
(74) *Attorney, Agent, or Firm* — Kenyon & Kenyon LLP

(57) ABSTRACT

A brake device for motor vehicles has at least two hydraulic brake circuits which are directly connected to a master brake cylinder, as well as an additional brake circuit, which is able to be actuated via a control device, independently of the master brake cylinder. Because of the separate hydraulic brake circuits in the region of the front axle, redundancy is provided, while the third brake circuit, that is able to be actuated independently of the master brake cylinder and typically acts on the rear wheels, during automatic actuation, permits taking into account a braking effect by additional active assemblies, such as a driven generator.

13 Claims, 3 Drawing Sheets

(56) References Cited

U.S. PATENT DOCUMENTS

| | | | |
|---|---|---|---|
| 8,029,072 B2 * | 10/2011 | Miyazaki et al. | 303/113.4 |
| 8,152,245 B2 * | 4/2012 | Lubbers | 303/151 |
| 2002/0079736 A1 * | 6/2002 | Soga | 303/113.1 |
| 2004/0135432 A1 | 7/2004 | Reuter et al. | |
| 2004/0227399 A1 | 11/2004 | Sasaki | |
| 2013/0049450 A1 * | 2/2013 | Kunz et al. | 303/3 |
| 2013/0057052 A1 * | 3/2013 | Kunz et al. | 303/3 |

FOREIGN PATENT DOCUMENTS

| | | |
|---|---|---|
| DE | 33 13 078 | 10/1984 |
| DE | 41 28 087 | 2/1993 |
| DE | 44 16 833 | 11/1995 |
| DE | 100 39 781 | 2/2002 |
| DE | 103 16 090 | 10/2004 |
| DE | 10 2005 046 606 | 4/2007 |
| DE | 10 2006 046 935 | 4/2008 |
| EP | 0 173 954 | 3/1986 |
| EP | 1 470 979 | 10/2004 |
| JP | 10-500083 | 1/1998 |
| JP | 2004-322810 | 11/2004 |
| JP | 2005-297771 | 10/2005 |
| JP | 2006-333549 | 12/2006 |

* cited by examiner

BRAKE DEVICE FOR A MOTOR VEHICLE HAVING AT LEAST THREE BRAKE CIRCUITS

BACKGROUND OF THE INVENTION

1. Field of the Invention

The present invention relates to multi-circuit braking systems having hydraulic brake circuits for motor vehicles.

2. Description of Related Art

In the field of motor vehicle construction, hydraulic brakes have been customary for a long time because of their efficiency and their functional safety. Multi-circuit brake systems take care of a redundancy that still further increases functional safety, and these systems often have several hydraulic brake circuits acted upon by pressure from one or more master brake cylinders. The pressure is generated first by operating a brake pedal and is then reinforced, if necessary. Starting from the master brake cylinder, the wheel brakes have pressure applied to them and are operated thereby, often controlled by valves.

It is also known that one may unload the brakes of a vehicle by additional deceleration elements. In this context, for example, an engine brake may be used, which is also capable of being quantitatively regulated by valve control, or electrical devices may be used such as eddy-current brakes or generators. As generators, generators usually come into consideration which are present in every vehicle, and which are used to charge the starter battery and for the electrical supply of the aggregates of the motor vehicle, or even a larger dimensioned drive motor of the vehicle, such as is present in hybrid vehicles. This drive motor may be driven as a generator in order to charge a battery used for the vehicle drive. Thus, kinetic energy of the vehicle may be stored during deceleration and used again later for accelerating the vehicle. The process of braking support while charging a battery is called recuperative brakes.

In such deceleration processes of the vehicle, however, various problems come up. The driver will usually want quantitatively to regulate suitably the braking effect by operating the brake pedal, in order to be able to optimize the braking distance and the measure of the braking deceleration for the respective traffic situation at hand. At the same time as the vehicle deceleration attained, the driver senses the counteracting force in the brake pedal, so that an iterative control process is made possible for him.

If an additional deceleration aggregate in the form of an operated generator is added to the direct braking effect, its deceleration effect is, on the one hand, not optimally able to be sensed by the driver, and on the other hand, the deceleration effect of the generator is also dependent on many boundary conditions and, not least of all, is changeable with time. For instance, the braking effect of the generator, at changing vehicle speed, may increase or decrease, and when the drive transmission is uncoupled, the deceleration effect at times drops off completely, so that when it is coupled in again, one carefully has to aim for it. An additional problem comes about when the battery is fully charged, since the additionally generated electric power then has to be removed in another way.

The combination of mechanical braking and additional deceleration of the vehicle by other influences is thus manageable for the driver, but not optimally controllable from a comfort point of view. The driver is able to compensate for changes in the vehicle deceleration only by equalization of the braking forces via the brake pedal.

A large number of methods is known from the related art that is supposed to support the driver in the control of brakes while observing comfort aspects and safety aspects. Among such methods are both traction control and dynamic braking during cornering for increasing the driving stability.

Thus, from published German patent document DE 4128087 A1, a brake pressure regulating system for a vehicle is known in which an underbraked rear axle is prevented when braking during cornering. The brake pressure at the front axle is specified by the driver, and the brake pressure at the rear axle is regulated as a function of this.

It is basically also known that one may distribute the brake force in such a way that as strong a braking as possible of the vehicle is achieved while taking grip utilization into account; in this context, it is also possible for wheels that are statically and/or dynamically more heavily loaded to be braked to a correspondingly greater degree as well.

From published European patent document EP 0173954 B1, a system is known in which the brake pressures for individual brakes are ascertained using a reference mass for the vehicle and the nominal deceleration specified by the driver in a stored vehicle-specific characteristic map. The brake pressures ascertained are applied at the brakes and, if necessary, are adjusted if the vehicle deceleration deviates from the nominal value, until the nominal deceleration has been achieved.

From published German patent document DE 3313078 A1, a brake pressure regulation device is known, which ascertains the wear of different wheel brakes and takes it into account, so that an even wear of the individual wheel brakes is achieved in the long term.

From German patent application document DE 102005046606, a braking system is known in which one brake circuit is assigned to one of the axles of a vehicle in each case, so that a traction control device, as well as an electronic stability control device, may be provided in one brake circuit exclusively, which minimizes the constructive overall expenditure.

Finally, from published German patent document DE 10316090 A1, a braking system is known which has a plurality of brake circuits, which basically act hydraulically and act on friction brakes of individual wheels, and which have a generator or an electric drive motor which is able to be operated as generator and may be used for deceleration of the wheels assigned to a brake circuit in addition. A control device is provided in order to optimize the brake force distribution to all individual wheels while taking into account different variables pertaining to driving dynamics.

BRIEF SUMMARY OF THE INVENTION

An object of the present invention is providing a brake device for a motor vehicle, which supports even complex control processes related to braking and vehicle dynamics, has the highest reliability possible, and has a simple constructive design, if possible.

The braking system described stands out in that the group of brake circuits controlled directly, using the braking pressure generating device, has at least two separate hydraulic brake circuits, so that a sufficient redundancy, and with that, functional safety would be taken care of during a failure in the electrical system. The brake circuits of the second group are able to be run exclusively using a hydraulic pump, and are thus not directly capable of being pressure-loaded by a brake pedal having a brake cylinder.

In the normal case, the braking command is recorded using an estimation or a sensor, for instance, by a position sensor or a pressure sensor on the brake pedal, and a corresponding signal is emitted to the control device. The latter records the braking command and, for the determination of the required brake operation of the brake circuits of the second group from the measured path of the brake pedal, it is able to determine the set braking effect of the brake circuits of the first group, or ascertain this using an acceleration sensor.

From the recorded braking command and the actually occurring braking effect a certain differential braking effect comes about, that has to be produced by the wheels which are actuated by the brake circuits of the second group.

The control device further takes into account the deceleration effect which acts on the corresponding wheels by possibly operated active assemblies, and subtracts this deceleration effect from the braking effect that is to be set using the brake device. As a result, the control device actuates corresponding valves of the second group of brake circuits, in order to operate the wheel brakes using the appropriately built-up hydraulic pressure. In this respect, the present invention may be used both in standard vehicles having an internal combustion engine and in hybrid vehicles which have several different drive systems.

If the deceleration effect of the active assembly(ies) changes gradually or abruptly, the control device reacts and changes the braking effect of the brake circuits of the second group with the aim of advantageously holding the overall braking effect constant.

The control device is supported by various sensors, in this instance, which permit an early prognosis of the changing deceleration effect of an active assembly.

One possible advantageous embodiment of the present invention provides that at least one of the wheels, whose wheel brakes are connected to brake circuits of the second group or also the first group, is additionally connected to an active assembly that has the effect of decelerating the respective wheel.

A generator is advantageously used as an active assembly in this context. It is able to convert kinetic energy to electricity, which is able either to be stored in a battery or consumed. With that, one is able to avoid possibly occurring heat problems in the dissipation of the deceleration energy, and the kinetic energy of the vehicle is advantageously able to be recuperated.

The present invention may advantageously be developed in that the corresponding generator is a generatorically operated electric drive motor of the motor vehicle.

This is possible in the case of exclusively electrically driven vehicles or hybrid vehicles, which have both an electric drive motor and an internal combustion engine.

The charging of the battery may be controlled by an appropriate charge control. If the battery is fully charged, the effective deceleration performance of the generator drops off. It this case it may be advantageous to connect electric consumers, such as a heater or the illumination of the vehicle, to the generator, so as to use up the electric energy.

Besides the actuation of the hydraulic brake circuits, such a control of the active assembly may also be taken over by the control device.

The control is then advantageously connected to a battery charging sensor and/or a generator power sensor, whereby an early prognosis of the deceleration performance of the generator is made possible. With that, the control device is able to intervene at the right time for avoiding jerking of the vehicle.

Besides balancing out between the deceleration effect of an active assembly and the braking effect directly by a hydraulic brake, the control device may also look after driving dynamics tasks in that, for example, when there is slip during acceleration, a wheel brake is automatically addressed in order to avoid the wheelspin of the respective wheel, during rapid cornering before the loss of driving stability, braking is performed correspondingly on one side in order to improve the road position of the vehicle, or in that the control device dynamically supports the cornering using braking of the wheel on the inner part of the curve.

An additional advantageous embodiment of the present invention provides that in each case a brake circuit of the first group is connected to a wheel brake of a front wheel of a motor vehicle.

It is ensured in this way that the brakes of the front wheels may be addressed independently of each other using redundant hydraulic brake circuits, and that appropriate brake safety is achieved. Corresponding decelerating active assemblies are then preferably used having action on the rear wheels of the motor vehicle, which are connected to one or more brake circuits of the second group.

This presents itself favorably as an option especially if the rear axle is driven, either using an internal combustion engine or an electric motor, or optionally one of the two.

It may particularly advantageously be provided that the control device is connected to means for influencing the braking force distribution to the brake circuits of the first group.

In this case, the control device is able to take over all necessary driving dynamics regulations in the actuation of individual wheel brakes or groups of wheel brakes and in the distribution of the braking force.

To increase driving comfort, it may also be provided that the hydraulic pumps allocated to the brake circuits of the first group are able to be decoupled mechanically from the pump drive, especially by an overrunning clutch that is controllable by the direction of rotation of the pump drive shaft.

With that, the hydraulic pump(s) of the first group of brake circuits is/are decoupled from the pump drive in the case when they are not needed to achieve a deceleration effect of the vehicle, that is, for example, in response to partial braking in the case of driving dynamics regulations. In this state, only the hydraulic pump or group of hydraulic pumps is still driven which supply the brake circuits of the second group with pressure. This gives the control device the possibility of applying pressure to the wheel brakes addressed by these brake circuits. At the same time, the hydraulic pumps of the first group are decoupled from brake circuits, so that no effect interfering with driving comfort occurs, such as pumping pulsation, which might disturb the driver if operating the brake pedal became necessary.

It may also be advantageously provided that the hydraulic pumps, allocated to the brake circuits of the first group, on the intake side are able to be connected via valves to the respective pressure output, and in particular, are connected via spring-loaded relief valves to the high-pressure side of the respective brake circuit.

In this case it is ensured by the appropriate line guidance of the hydraulic lines and the control of the valves that the hydraulic pumps of the first group of brake circuits do not build up pressure. They move the hydraulic fluid in a no-load circuit.

Besides a brake device described above, the present invention also relates to a method for operating such a brake device, in which the brake circuits of the second group and possibly the effect of the active assemblies are controlled as a function of the braking command and of the actually achieved braking effect by the first group of brake circuits.

DETAILED DESCRIPTION OF THE INVENTION

Figure 1:
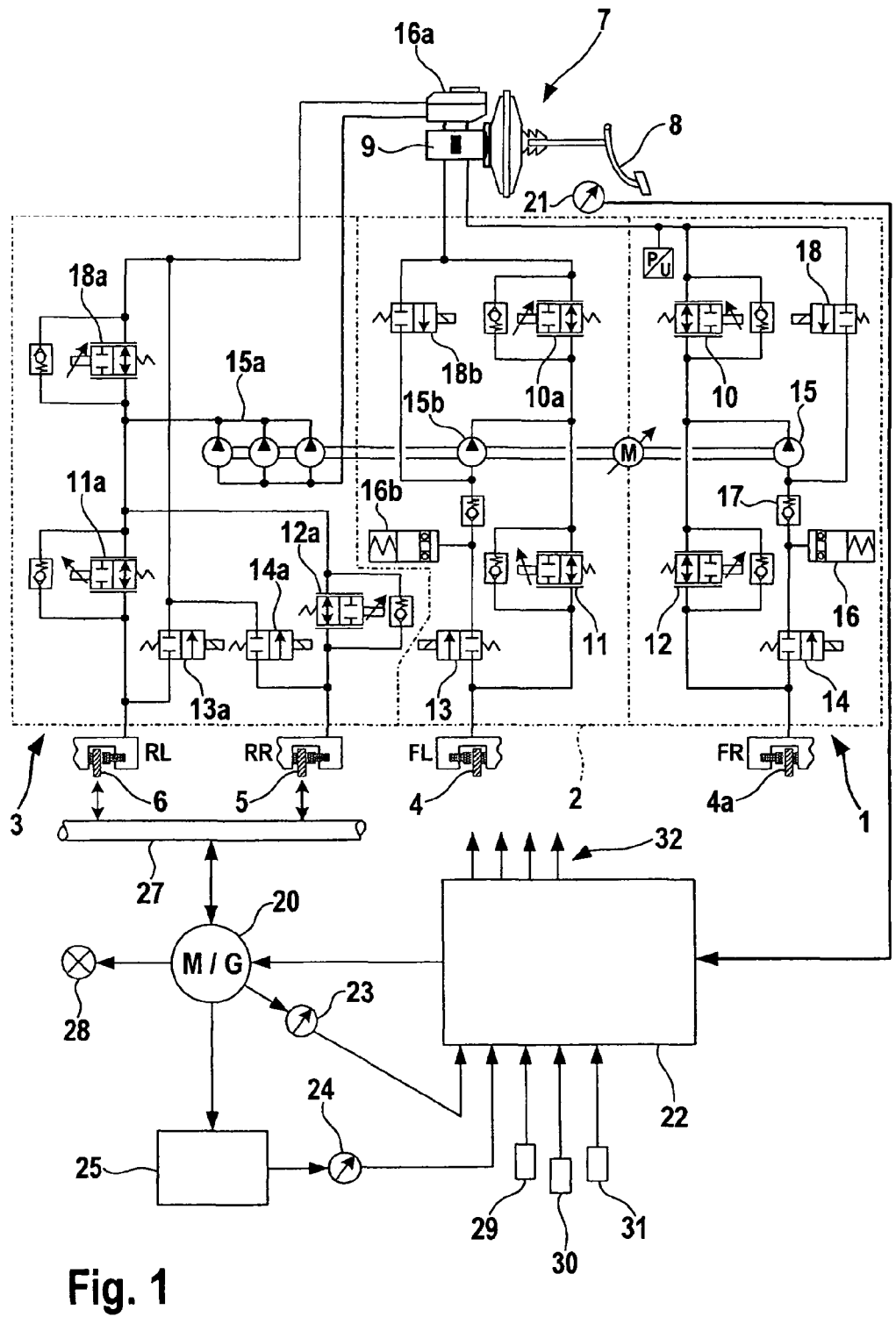
FIG. 1 shows the hydraulic line plan of a brake device according to the present invention having three hydraulic brake circuits.

The brake device shown in FIG. 1 is similar in individual parts to a known standard modulating system having an active pressure-build-up. The front axle having left front wheel 4 and right front wheel 4a is equipped with two separate brake circuits, first brake circuit 1 and second brake circuit 2, of which each represents a completely modulation-capable braking system. Third brake circuit 3 is developed hydraulically, the same as first and second brake circuits 1, 2, and supplies in common the two rear wheel brakes of wheels 5, 6. The individual brake circuits are indicated by dotted lines. A common pump drive M is provided for hydraulic pumps 15, 15a, 15b of all three brake circuits, so that an active pressure build-up is able to take place in each brake circuit by itself. Individual braking effects on individual wheels can take place either by individual control of brake circuits 1, 2 of the first group or individual actuation of the wheel brakes of brake circuit 3 of the second group.

The hydraulic pump allocated to the front axle may be developed per wheel brake as a one-piston pump 15, 15b, while hydraulic pump 15a, that supplies third brake circuit 3 may be developed as a three-piston pump. Other pump configurations having other numbers of pistons or pumps that work according to different principles, such as gear pumps, are also conceivable. Master brake cylinder 9 of brake operating device 7 is not connected to third brake circuit 3. For this reason, in case of electric failure, only brake circuits 1, 2, which are allocated to the front wheel brakes, are addressed which, however, is sufficient because of the redundancy and the available braking force reinforcement.

In the unbraked case, all valves are without current. Pressure regulating valve 18a of third brake circuit 3 is then open, so that an adjustment can take place from the wheel brake cylinders of rear wheels 5, 6 to pressure-less reservoir 16a. In the partially braked case, brake circuits 1, 2 are operated normally hydraulically, while the third brake circuit is controlled via control device 22, which taps the braking command by a sensor 21, using control outputs 32 via pressure regulating valve 18a as well as pressure-generating valves 11a, 12a and pressure reduction valves 13a, 14a. Pressure regulating valve 18a may advantageously be developed as a constantly adjustable pressure regulating valve, which is controlled using a specified pressure difference. However, it may also be provided that an absolute pressure is actuated. To do this it is necessary, however, to provide appropriate pressure sensors in the high-pressure part of third brake circuit 3. This or these sensor(s) may be situated in the vicinity of the wheel brake cylinder, for example.

The present invention makes a high pressure reservoir for not directly hydraulically addressed brake circuit 3 superfluous, without having to do without the necessary redundancy. The latter is given by the multi-circuit construction of the front wheel brake device. The controllability of individual wheel brakes is also implementable both at the front wheels by different addressing of the individual brake circuits and at the rear wheels by corresponding control using control device 22.

FIG. 1 shows a multi-circuit brake system having a first brake circuit 1, which is constructed in the same way as second brake circuit 2, on the right side of the figure, and a third brake circuit 3, which forms the only brake circuit of the second group of brake circuits in the illustrated exemplary embodiment.

In the following text, the function of first brake circuit 1 will be described to begin with, and then the special features of third brake circuit 3.

FIG. 1 shows a first brake circuit 1 on the right side, which is assigned to front wheels 4a of a two-axle motor vehicle, as well as a second brake circuit 2, which is assigned to front wheel 4 of the motor vehicle. The brake circuits are indicated by dashed and dotted lines in each case. In the specific case in which the motor vehicle has only three brake circuits, the first two brake circuits form the first group of brake circuits, which are directly operable hydraulically, while the third brake circuit forms the second group of brake circuits, which are not connected to a hydraulic brake operating device 7.

Hydraulic brake operating device 7 has a brake pedal 8 as well as a double master brake cylinder 9, in which hydraulic pressure for actuating the brake device in response to the depression of brake pedal 8 is built up.

First of all, the basic function of such a module is to be explained by way of example with the aid of first brake circuit 1.

If brake pedal 8 is operated, an increased brake pressure is applied in master brake cylinder 9. Via the so-called switch-over valve 10, whose further function is going to be explained in the following text, the brake pressure is supplied to pressure-build-up valves 12, that is assigned to wheel 4a.

Pressure-generation valves 11, 12 basically transmit the increased hydraulic pressure to the brake cylinders of wheels 4, 4a, so that the corresponding friction brakes, e.g., in the form of disk brakes, are actuated. When the brake pedal is released, the release of braking also takes place via valves 11, 12. When there is independent release of braking during the operation of the brake pedal, for instance, during the intervention of an ABS control, at least one of pressure reduction valves 13, 14 is opened, the hydraulic pressure in the corresponding wheel brake cylinder is reduced, and the hydraulic fluid is carried off to the intake side of hydraulic pump 15, 15b. On the intake side of hydraulic pump 15, 15b, a hydraulic reservoir 16, 16b is also provided for the compensatory volume flow for the hydraulic fluid. A relief valve 17 takes care that, from the intake side of the hydraulic pump, no hydraulic fluid is able to flow to pressure reduction valves 13, 14 or to reservoir 16.

Normally, an anti-lock protection device is provided for the individual wheels, which prevents locking of the wheels during excessive braking. For this purpose, rpm sensors (not shown), for example, are provided at wheels 4, 4a, which emit a signal to a control device 22 when a wheel is locking. In response, brake-pressure generation valve 11, 12 assigned to the wheel is closed, and the associated brake-pressure lowering valve 13, 14 is opened at the same time in order to nullify the blocking of the wheel. Hydraulic pumps 15, 15b is actuated at the same time, in order to pump the hydraulic fluid, arriving at its intake side, to the primary side of the brake circuit again.

When the corresponding wheel is rotating again, the pressure, and thus the braking effect, can be increased again by opening brake-pressure generation valve 11, 12 until another locking event appears imminent again. This iterative process requires hydraulic fluid under high pressure on the primary side of the brake circuit, which is provided from the master brake cylinder by the brake operation of the driver. Hydraulic pump 15, 15b empties hydraulic reservoir 16 and takes care that the hydraulic fluid is conveyed back.

The process described may also be carried out in a similar way if, when the vehicles drives off, slip threatens to take place at one wheel or at several wheels, or when a wheel brake is operated for the purpose of a driving dynamics regulation, without there being a braking pressure in the master brake cylinder. In both cases, the required pressure for operating the wheel brake cylinder is able to be supplied by hydraulic pump 15, 15b.

In this case, switch-over valves 10, 10a are actuated as well as hydraulic pumps 15, 15b.

At the same time, so-called intake valve 18, 18b is opened, so that hydraulic fluid is able to flow from the region of the master brake cylinder to the intake side of hydraulic pump 15, 15b.

The function of third brake circuit 3 on the left side of FIG. 1 is basically the same as that of first brake circuit 1, with the exception that third brake circuit 3 is completely decoupled from master brake cylinder 9. In the description of the method of functioning of the third brake circuit, the following conditions must be distinguished:

1. When the vehicle is running without deceleration, neither a wheel brake 5, 6 is actuated nor is an active assembly 20 used for deceleration, e.g., in the form of an electric drive motor operated as a generator.
2. In case of partial braking, recuperative braking preferably takes place, that is, a known brake torque by active assembly 20 is acting on wheels 5, 6. The deceleration command made known by the driver by operating brake pedal 8, may be recorded by a sensors 21 or by estimation and forwarded to control device 22. The deceleration torque of active assembly 20 is known to control device 22, or it is measured with the aid of a power sensor 23 and transmitted. As an alternative or in addition, the charge state of a battery 25, which is charged by the active assembly, may also be recorded by a charge sensor 24 and forwarded to control device 22 in order to determine the load condition of active assembly 20.

Taking into account the braking command, the deceleration effect actually achieved by first brake circuit 1, 2 through hydraulic means, and the known deceleration torque of active assembly 20, control device 22 calculates the brake deceleration to be achieved by the third brake circuit and sets it, primarily by actuating switch-over valve 18a, which is operating as pressure-differential control valve. This may be done by modulation of switch-over valve 18a when hydraulic pump 15a is possibly running. The hydraulic pressure thus generated and set is transmitted to braking pressure generating valves 11a, 12a, which pass on the pressure to the wheel brake cylinders of wheels 5, 6. In the case of the usual partial braking processes, the release of braking advantageously takes place via valve 18a and valves 11a, 12a. In a pressure decrease individual to each wheel, for instance in response to the inclusion of an ABS, the release of braking takes place via valves 13a or 14a.

The required operation of third brake circuit 3 is basically reduced by the additional deceleration effect of active assembly 20 on wheels 5, 6 via drive shaft 27, and corresponding energy is recuperated via the active assembly and stored in battery 25, for instance.

In cases in which the deceleration torque of active assembly 20 fluctuates, i.e., when battery 25 is fully charged, for instance, the vehicle slows down or the drive train is decoupled from the wheels by a gear-shift operation, keeping the overall deceleration constant requires control device 22 either to increase the deceleration torque of the active assembly, to the extent possible, for instance, by connecting an electric consumer 28, and/or the control of third brake circuit 3 must be changed in such a way that the modified brake force compensates for the changed deceleration torque of active assembly 20.

In the brake device according to the present invention, this is considerably easier to accomplish than in conventional brake devices because the direct actuation of first brake circuit 1, 2 keeps the braking effect achieved there constant and lets it be controlled quite well by the driver on the one hand, and the compensation of braking effects between the two independent partial-brake devices 3, 20 via control device 22 is able to be realized fairly easily and continuously.

In the region of control device 22, FIG. 1 also shows sensors 29 (transverse acceleration sensor), 30 (slip sensor) and 31 (driving speed sensor). Furthermore, a driving-direction sensor may be provided, which helps control device 22 to differentiate between forward and reverse travel, so that the brakes of the rear axle may be loaded more heavily in reverse travel.

In addition, control device 22 may be connected to rpm sensors at wheels 5, 6, as well as to a sensor that indicates the actuation of the gear clutch.

The corresponding outputs 32 are connected to the controllable valves of the brake circuits.

Figure 2:
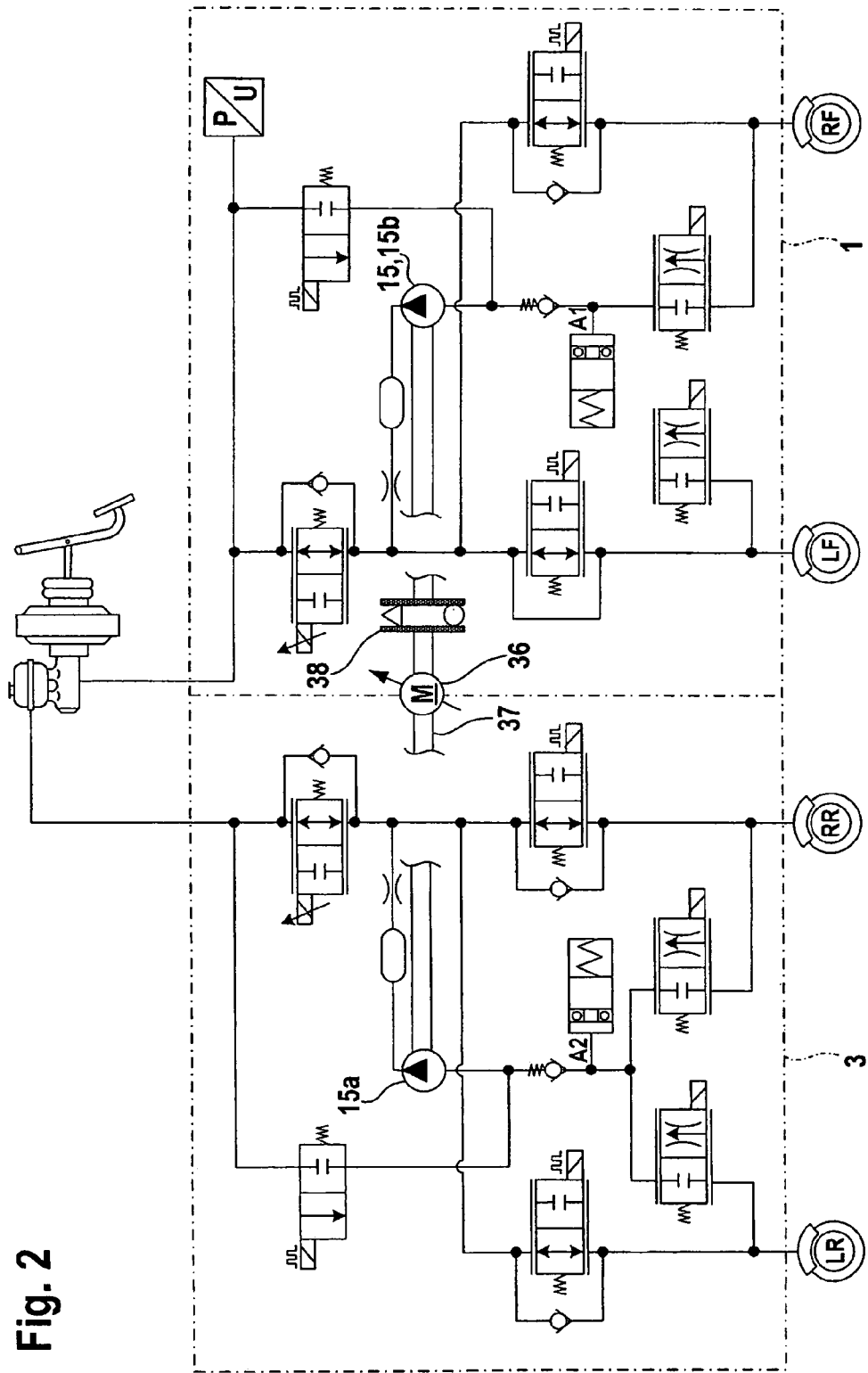
FIG. 2 shows the functioning of a mechanical decoupling device for hydraulic pumps.

In FIG. 2, the structure and method of functioning of control device 22 are omitted for the sake of clarity. However, they are basically comparable to those shown in FIG. 1. Identical parts are provided with the same reference symbols.

FIG. 2 shows a brake device, which corresponds to the device shown in FIG. 1 in large parts, for the sake of simplicity, in the right part of the figure, a single brake circuit including two wheels being shown instead of the first and second brake circuits assigned to the individual front wheels. However, a device is shown there, for example, that is applicable to the present invention, which enhances comfort in that a respectively not required hydraulic pump 15, which takes the place of hydraulic pumps 15 and 15b in FIG. 1, is decoupled from the drive train of pump drive motor 36 when it is not needed. This is done in that pump drive motor 36 is basically able to drive corresponding drive shaft 37 in both directions of rotation, and in that hydraulic pump 15a of a further brake circuit 3 is able to generate a hydraulic pressure independently of the direction of rotation of shaft 37. A mechanical overrunning device 38 is formed on shaft 37, between drive motor 36 and hydraulic pump 15, which ensures that hydraulic pump 15 of the first brake circuit is driven in only one direction of rotation of shaft 37, but not in the opposite running direction.

This prevents the pumps of the first and second brake circuit from also running, when pressure is being built up in third brake circuit 3 by hydraulic pump 15a, and from producing undesired pulsations, which the driver would sense if perhaps he operated the brake pedal. This may bet the case, for instance, during partial braking.

Figure 3:
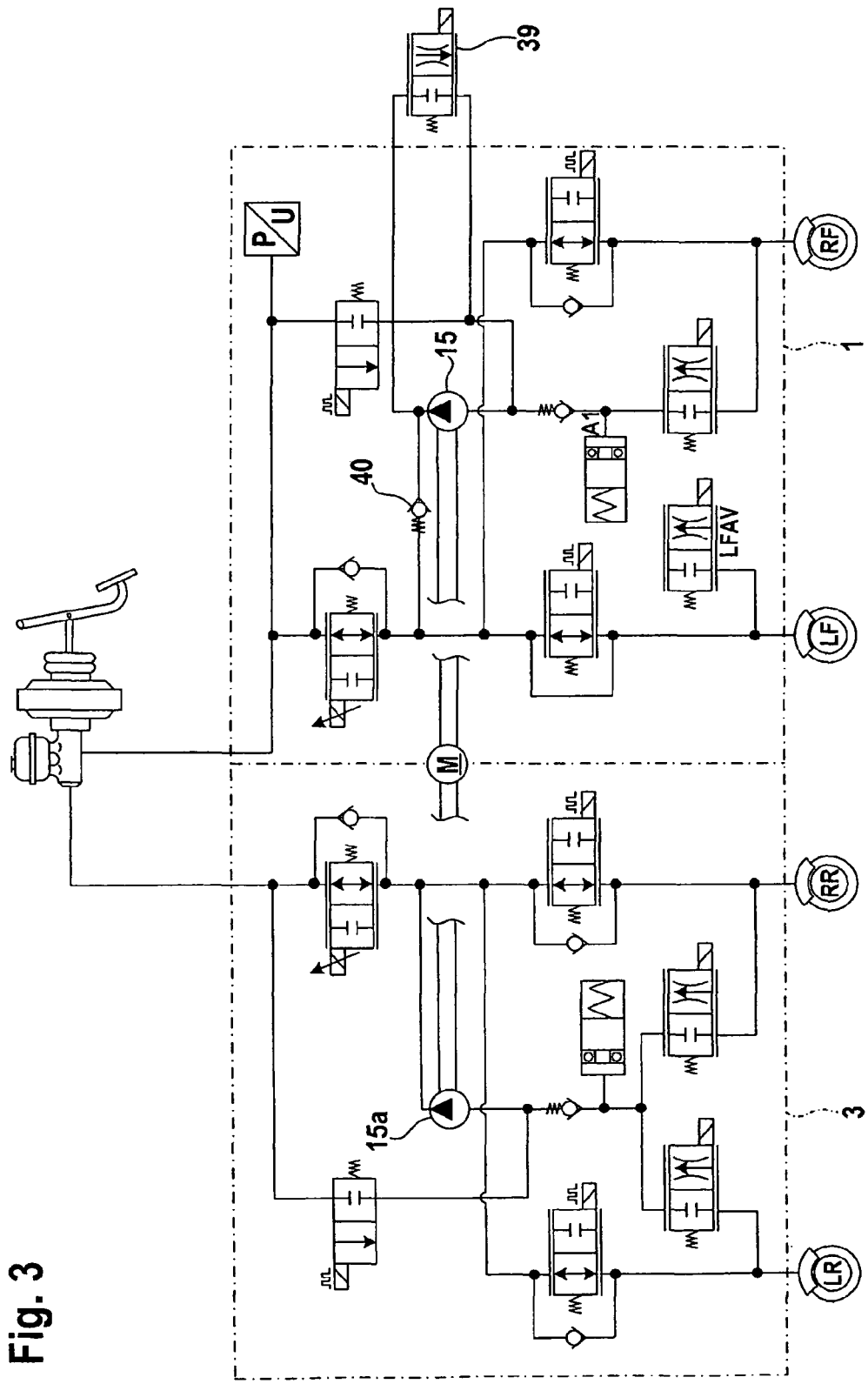
FIG. 3 shows a hydraulic decoupling device for decoupling hydraulic pumps of brake circuits.

FIG. 3 shows a brake device similar to the one shown in FIG. 2, for the sake of simplicity, in the right part of the figure, a single brake circuit including two wheels again being shown instead of the first and second brake circuits assigned to the individual front wheels. The task of decoupling the hydraulic pressure production of the first/second brake circuit 1/2 from the hydraulic pressure production in third brake circuit 3 is not solved in this case by a mechanical free-running of the drive shaft of the hydraulic pumps, but rather in that hydraulic pump 15 of first brake circuit, which again stands for hydraulic pumps 15, 15b of the first and second brake circuit, is driven, to be sure, along with hydraulic pumps 15a of further brake circuit 3, but in the decoupling case, the output side of hydraulic pumps 15/15b are in each case connected via a switching valve 39, which is opened in this case, to the intake side, respectively, of the same hydraulic pump 15, 15b, so that the respective pump conveys hydraulic fluid in a circle. This ensures idling of hydraulic pumps 15, 15b so that pulsations are avoided.

Hydraulic pumps 15, 15b are each connected to the high-pressure side of first/second brake circuit 1/2, via a spring-loaded relief valve 40, in order to absorb pulsations of hydraulic pumps 15/15b that may occur, or reduce pressure peaks via the primary side of respective brake circuit 1.

The brake device according to the present invention thus permits a comfortable utilization of recuperative brake processes, fluctuations within a subsystem of the brake device being able to be intercepted and balanced out, and consequently remaining imperceptible for the driver and the passengers of the vehicle. In addition, a further subsystem of the brake device is provided, which remains uninfluenced by the transient phenomena, and functions conventionally. A competent control device controls all occurring brake and deceleration effects in a suitable manner.

Because control device 22 is able to react to fluctuations of the deceleration effect of active assembly 20, a continuous concealment is possible, using the braking effect of third brake circuit 3, which makes possible braking free from jerking motions, in a comfortable manner.

What is claimed is:

1. A brake device for a motor vehicle, comprising:
   a first brake circuit group having at least two hydraulic brake circuits;
   a braking pressure generating device connected to the first group of at least two hydraulic brake circuits, wherein the braking pressure generating device is configured to be operable one of manually or using a pedal, and wherein effect of the braking pressure generating device on wheel brakes is controllable by associated valves; and
   a second brake circuit group having at least one hydraulic brake circuit, wherein the second brake circuit group is hydraulically decoupled permanently from the braking pressure generating device, and wherein the second brake circuit group is configured to be controlled exclusively using an automatic control device, wherein the brake circuits of the first brake circuit group and the second brake circuit group each have at least one hydraulic pump, the hydraulic pumps being kinematically connected to a common pump drive, wherein the intake side of the hydraulic pumps assigned to the brake circuits of the first brake circuit group are configured to be selectively connected to the high pressure side of the respective brake circuits, and wherein for a decoupling of a hydraulic pressure production in the brake circuits of the first brake circuit group from a hydraulic pressure production in the hydraulic brake circuit of the second brake circuit group, the at least one hydraulic pump assigned to the first brake circuit group is in an idling state.

2. The brake device as recited in claim 1, further comprising:
   an active assembly, wherein at least one wheel having a wheel brake connected to the hydraulic brake circuit of the second brake circuit group is additionally connected to the active assembly, and wherein the active assembly effects a deceleration of the at least one wheel.

3. The brake device as recited in claim 2, wherein the active assembly is an electric generator.

4. The brake device as recited in claim 3, wherein the generator is an electric drive motor of the motor vehicle configured to be selectively operated as the generator.

5. The brake device as recited in claim 4, wherein the generator is connected to a battery.

6. The brake device as recited in claim 5, wherein the generator is configured to be selectively connected to an electric load.

7. The brake device as recited in claim 5, wherein the control device is connected to at least one of: a transverse acceleration sensor; a slip sensor; a travel speed sensor; and a travel direction sensor; and a steering command sensor.

8. The brake device as recited in claim 5, wherein the control device is connected to at least one of a battery charge sensor and a generator power sensor.

9. The brake device as recited in claim 5, wherein each brake circuit of the first group is connected to a corresponding wheel brake of a front wheel of the motor vehicle.

10. The brake device as recited in claim 9, wherein a brake circuit of the second group is connected to both wheel brakes of two rear wheels of the motor vehicle.

11. The brake device as recited in claim 10, wherein the brake circuit of the second brake circuit group acts upon a rear axle driven by a motor.

12. The brake device as recited in claim 5, wherein the brake circuits of the first brake circuit group and the second brake circuit group each have at least one hydraulic pump, the hydraulic pumps being kinematically connected to a common pump drive, and wherein the intake side of the hydraulic pumps assigned to the brake circuits of the first brake circuit group are configured to be selectively connected to the high pressure side of the respective brake circuits via spring-loaded relief valves.

13. The brake device as recited in claim 1, wherein the automatic control device is connected to valves for controlling the effect of the braking pressure generating device on the brake circuits of the first brake circuit group.

* * * * *